(12) United States Patent
Dellock et al.

(10) Patent No.: US 10,513,591 B2
(45) Date of Patent: Dec. 24, 2019

(54) LOW COST HIGH HEAT POLYMER WITH IMPROVED SOUND DEADENING PROPERTIES MADE WITH RECYCLED PLASTICS

(71) Applicant: FORD GLOBAL TECHNOLOGIES, LLC, Dearborn, MI (US)

(72) Inventors: Paul Kenneth Dellock, Northville, MI (US); Talat Karmo, Waterford, MI (US); Stuart C. Salter, White Lake, MI (US); Joel Thomas Pierce, Dearborn, MI (US); Michael A. Musleh, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 350 days.

(21) Appl. No.: 15/429,960

(22) Filed: Feb. 10, 2017

(65) Prior Publication Data
US 2018/0230289 A1  Aug. 16, 2018

(51) Int. Cl.
| | | |
|---|---|---|
| *C08K 3/34* | (2006.01) | |
| *C08K 7/04* | (2006.01) | |
| *C08K 7/10* | (2006.01) | |
| *B60R 13/08* | (2006.01) | |

(52) U.S. Cl.
CPC ............ *C08K 3/34* (2013.01); *B60R 13/0861* (2013.01); *C08K 7/04* (2013.01); *B60R 13/0876* (2013.01); *B60R 13/0884* (2013.01)

(58) Field of Classification Search
CPC . C08K 3/34; C08K 3/346; C08K 7/04; C08K 7/10; C08K 2201/016
See application file for complete search history.

(56) References Cited

U.S. PATENT DOCUMENTS

| | | |
|---|---|---|
| 7,694,779 B2 | 4/2010 | Takayasu et al. |
| 8,030,388 B2 | 10/2011 | Mukasa et al. |
| 2008/0176048 A1* | 7/2008 | Onizawa ............. B29C 45/0001 428/195.1 |
| 2009/0292035 A1* | 11/2009 | Semmes ................ C08J 9/0061 521/141 |
| 2014/0050886 A1 | 2/2014 | Burgin et al. |
| 2015/0314738 A1 | 11/2015 | Kim et al. |

FOREIGN PATENT DOCUMENTS

| | | | |
|---|---|---|---|
| CN | 102731903 A | * | 10/2012 |
| CN | 102911482 B | | 11/2015 |
| CN | 103692990 B | | 8/2016 |
| GB | 2265569 B | | 5/1995 |

OTHER PUBLICATIONS

English Machine Translation of CN102911482B.
English Machine Translation of CN103692990B.

* cited by examiner

*Primary Examiner* — Kara B Boyle
(74) *Attorney, Agent, or Firm* — Vichit Chea; Carlson, Gaskey & Olds, P.C.

(57) ABSTRACT

A high heat polymer with improved sound deadening properties is provided. The material includes recycled PET (Polyethylene terephthalate) as its base polymer and combination of mineral fillers and fibers to improve heat deflection temperatures and to create a barrier within the polymer that blocks noise. The material uses use a combination of basalt fibers and mica to provide improved resistance to heat and improved elastic modulus and significant dampening of sound. The high heat performance and improved sound attenuation of the material enables the deletion of heat shields and added NVH pads to many under body and under-hood parts, as well as significantly reducing the material cost and weight in automobiles.

13 Claims, 6 Drawing Sheets

Tan Delta Peak Height

Mica orientation with Laminar Flow

Example of Underbody Cover & Shield (100)

LOW COST HIGH HEAT POLYMER WITH IMPROVED SOUND DEADENING PROPERTIES MADE WITH RECYCLED PLASTICS

TECHNICAL FIELD

The disclosure herein relates to a novel composition for use in motor vehicles and similar that provides shielding from generated heat as well as significant sound dampening.

BACKGROUND

As fuel economy standards are being increased on motor vehicles, a resulting higher focus is placed on improving fuel economy. Improved aerodynamics is a key to improving motor vehicle fuel economy, as is lowering the overall weight of the motor vehicle. At the same time, comfort in operating the motor vehicles is also high on consumer appeal and the overall quietness of motor vehicles is becoming more important to customers. Accordingly, reducing the amount of noise in the cabin of the motor vehicles is also important To attempt to address these issues, manufacturers are adding more underbody covers and shields to close off sections of the underbody with large panels that serve the dual purpose of smoothing the underbody surface to improve aerodynamics of the motor vehicle by essentially enabling air to efficiently flow under the motor vehicle and closing off the underbody to reduce sound penetration in to the interior of the vehicle.

Most of the industry uses covers and shields made from very low cost polymers like polypropylene and high-density polyethylene (HDPE). To improve stiffness heat resistance and dimensional capabilities of the material fillers such as glass and talc are added. These blends are relatively cheap and are the traditional materials used in these applications. They however lack the properties of sufficient sound attenuation and heat deflection.

The melting point of HDPE is about 130° C. and the melting point of polypropylene is about 160° C. It is frequently required to place these parts under engines and near exhaust systems, where typically the heat generated by the engine and exhaust manifold require withstanding temperatures as high as 225° C. To correct for this serious shortcoming, manufacturers add a combination of heat shields and noise, vibration and harshness (NVH) pads (e.g. high-temperature needled polyester) to the back of these covering parts. However, adding the heat shields and pads significantly increases the overall weight of the vehicle. A material composition that can on its own withstand temperatures of at least 225° C. and suppress noise would remove any requirement for added heat shields and pads thereby providing a substantial benefit.

SUMMARY OF THE INVENTION

A novel composition with good heat deflection and noise suppression that when used as an underbody cover or shield does not require added heat shields and pads is described herein. The composition comprises a base polymer of polyethylene terephthalate (PET) and a filler blend of mica and basalt fibers. The base polymer may be a blend of recycled PET and virgin PET at a ratio of between about 1:1 and 2:1 of virgin PET to recycled PET. The base polymer may be at least about 50 percent by weight of the composition. In some embodiments the base polymer may be between about 55 and 70 percent by weight of the composition.

The filler, in some embodiments, may comprise between about 30 and 35 weight percent of the composition. In some instances the mica to basalt ratio within the filler is between about 25 to 10 and 20 to 15. In some embodiments, mica has an aspect ratio of about 85 to one.

The composition can provide heat and sound shielding without the bulk and weight of current heat shields and pads. The composition can be molded into a part or parts to be inserted as a barrier between a vehicle's carriage and underbody.

In some instances, the composition may be comprised of about 35 to 40 percent by weight of the composition of virgin PET, about 25 to 30 percent by weight of the composition of recycled PET, about 20 to 25 percent by weight of the composition of mica and about 5 to 10 percent by weight of the composition of basalt fiber. In other embodiments still, the composition may be comprised of about 30 percent by weight of the composition of virgin PET, about 30 percent by weight of the composition of recycled PET, about 20 percent by weight of the composition of mica and about 15 percent by weight of the composition of basalt fiber.

Also provided are embodiments where other agents are added such as a coloring agent, a stabilizer, a flow enhancer and/or a coupling agent.

Further provided are methods of making the composition described herein, for molding the composition to a desired shape and to inserting a molded piece between a vehicle's cabin and underbody.

DETAILED DESCRIPTION

A novel composition for use in automobiles and similar that provides shielding from generated heat, as well as significant sound dampening is described as follows. Use of the composition as underbody covers and shields for motor vehicles removes need to rely on heat shields and pads. The composition comprises a base polymer of polyethylene terephthalate (PET or polyester), with a filler comprised of mica and basalt fibers. The PET may comprise recycled PET in part or entirely. The composition may be molded into a single piece or multiple pieces to be affixed to the underbody of a vehicle, effectively replacing the need for heat shields and NVH pads.

Heat shields in the automobile industry currently utilize HDPE and polypropylene as a base polymer. However, the melting point of HDPE and polypropylene is about 130° C. and 160° C., respectively. Heat shields comprised of these polymers potentially melt and fail to deflect heat at higher temperatures possible under automobile operating conditions. Currently, manufacturers add heavy heat shields and pads to prevent destruction to underbody covers. The underbody covers molded of the compositions described herein overcomes these limitations as the composition itself is capable of sufficient heat deflection and noise suppression.

PET (polyethylene terephthalate) functions within the composition as a base polymer, the properties of which render conventional heat shields and NVH pads unnecessary. PET is a widely available polymer with a melting point of around 250° C. PET is also one of the most recycled polymers in the world (e.g. used in most soda bottles). PET, including recycled PET and virgin PET (non-recyled), thus provides an abundant polymer with an improved melting point as a base polymer of the new material. The base polymer may thus comprise virgin PET, recycled PET or combinations or blends thereof.

The compositions herein are designed to provide two improvements for underbody covers in automobiles: higher resistance to heat and greater ability to block noise from entering the vehicle. Including mineral fillers and fibers offer approaches to improve heat deflection temperatures and noise suppression. However, adding fillers reduces the ductility of the material. As the part of the underbody of a vehicle, a region that often sees impact during regular operation, it is important to limit the amount of overall fillers. Accordingly, the compositions described herein in certain embodiments limit overall fillers to about 30 to 35% by weight of the final composition. In other embodiments, the presence of fillers can be higher or lower depending on the final properties desired.

In order to satisfy both desired requirements of the filler without further limiting the presence of the base polymer, a filler comprised of a combination of basalt fibers and mica is provided as a component of the compositions.

Figure 1:
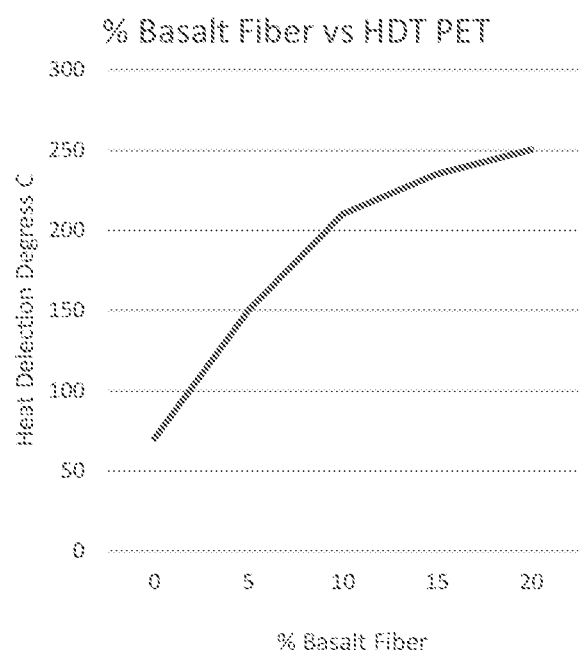
FIG. 1 shows the effect of basalt fibers on HDT in PET based compositions.

Basalt fibers offer improved resistance to heat, as well as improved elastic modulus for better stiffness when compared to traditional glass fibers that are often utilized in heat shield compositions. The HDT (heat deflection temperature) of PET compositions can be raised by the addition of fillers, such as glass. Typically, at least 30% of the composition must be glass fibers to achieve such. However, as basalt fibers are stiffer than glass, the HDT of the PET can be raised to 250 C with less, reducing the required amount of filler to 20%, as shown in FIG. 1.

Figure 2:
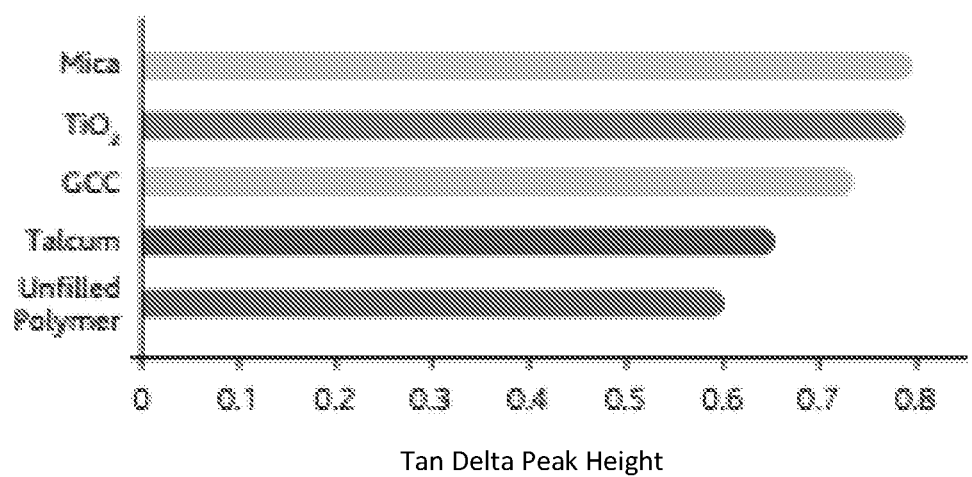
FIG. 2 shows a comparison of tan delta peak height (x-axis) from different filler materials.

The second material for the filler is mica. Mica has better HDT than traditional filler. Mica further provides a geometry that can create a sound barrier within polymers. Both basalt and glass fibers are needle like in shape. The shape of mica is plate-like, which provides a significant advantage in dampening sound. One way to compare ability to dampen sound is by comparison of a materials tan delta. The tan delta is known as the "Loss Factor" due to loss of energy from the impact force of sound waves via conversion and dispersal of energy. Thus, the tan delta is ultimately an indication of the effectiveness of a material's sound damping capabilities. The higher the tan delta, the greater the damping coefficient, the more efficient the material will be in effectively accomplishing energy absorption and dispersal. FIG. 2 compares the Delta Tan of 20% filled PP resin using various common fillers. As seen in FIG. 2, mica is a filler material with properties that allow for improved sound attenuation.

Figure 3:
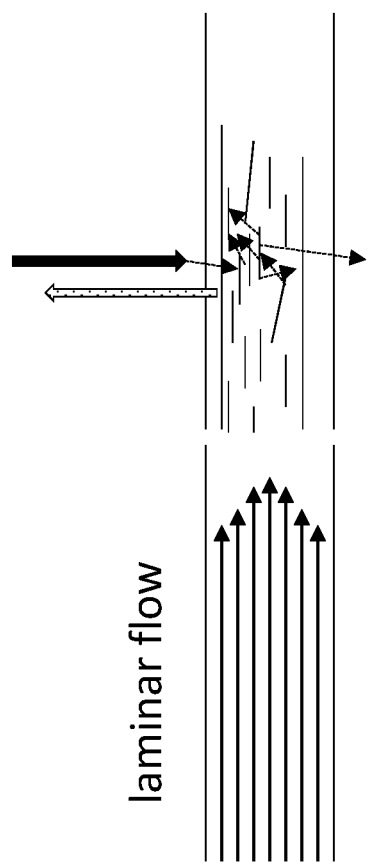
FIG. 3 shows orientation of mica with laminar flow and how the orientation provides for dissipation of sound energy as it traverses across the shield.

During injection molding or extrusion, the flow the polymer blends fill their tool with a laminar flow. The plate-shapes of mica orient along this flow front (see FIG. 3). Mica plates essentially stacked on top of each other along the direction of flow, forming a sort of loose wall. Thus, when a sound wave hits the mica reinforced material, the majority of sound reflects back off of the outer surface, while the remainder the sound wave hits the mica and bounces between the plate of mica and exits through the opposite side. Each time the sound wave bounces off the plates of mica, energy is spent, thereby significantly reducing the amplitude of the sound that passes through the part.

The aspect ratio and size of the filler can be essential for sound attenuation. A higher aspect ratio of the plate diameter/size permits sound waves to travel further to circumvent the plate and more energy is burned by the length the sound wave travels. Mica provides a material with potential aspect ratios of above 80 to 1, such as around 85:1, 86:1, 87:1, 88:1, 89:1, and 90:1. In comparison, a typical filler such as talc has an aspect ratio of about 16 to 1 Accordingly, sound must travel five times as far to go around mica as compared to talc.

Mica further can further assist in preparing the heat shield, as its orientation allows for improved flow of the polymer composition, thus making it easier to fill a mold for the shield, particularly at points where the shield may have a narrower wall thickness.

Figure 4:
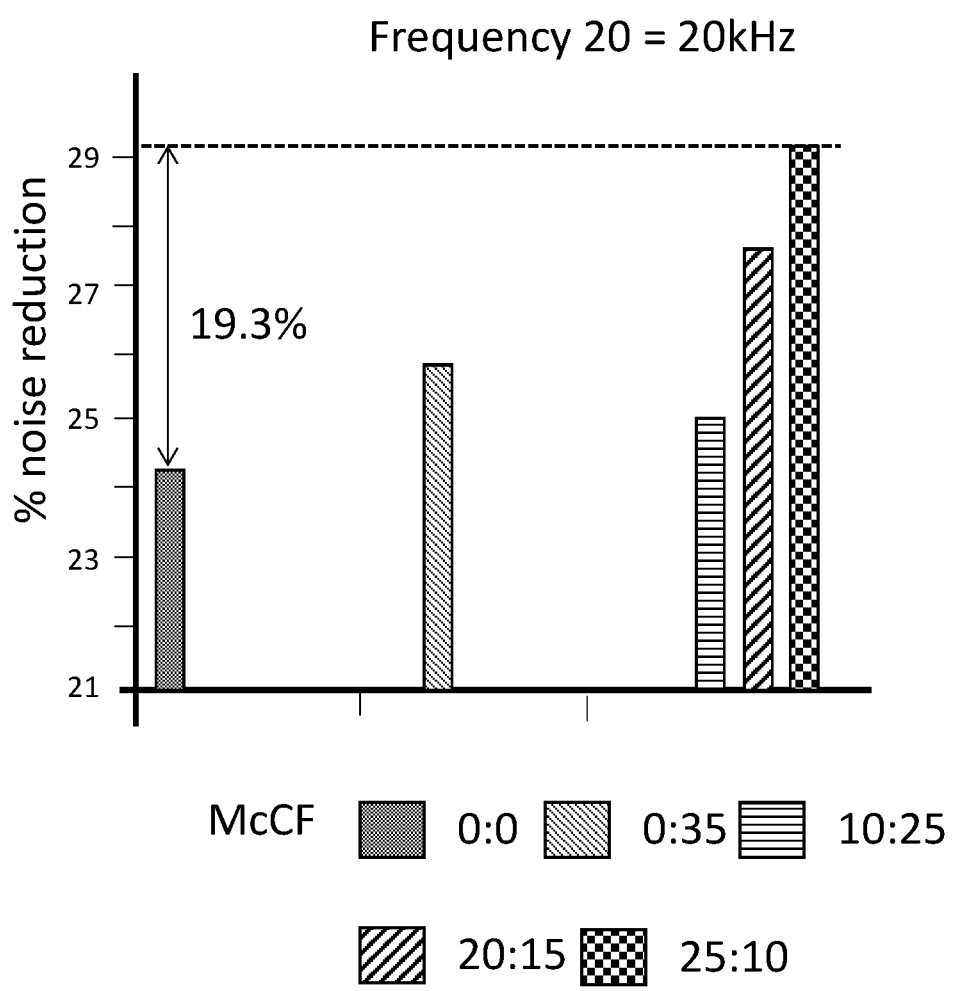
FIG. 4 shows the how sound attenuation varies based on level of filler.
Figure 5:
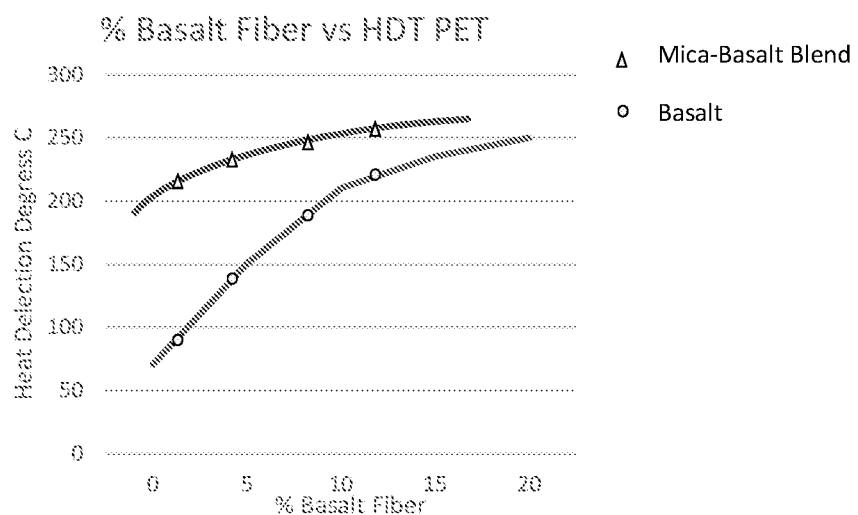
FIG. 5 shows heat deflection temperature of mica-basalt blend (triangles) as 35% of the composition as compared to basalt only (FIG. 1).
Figure 6:
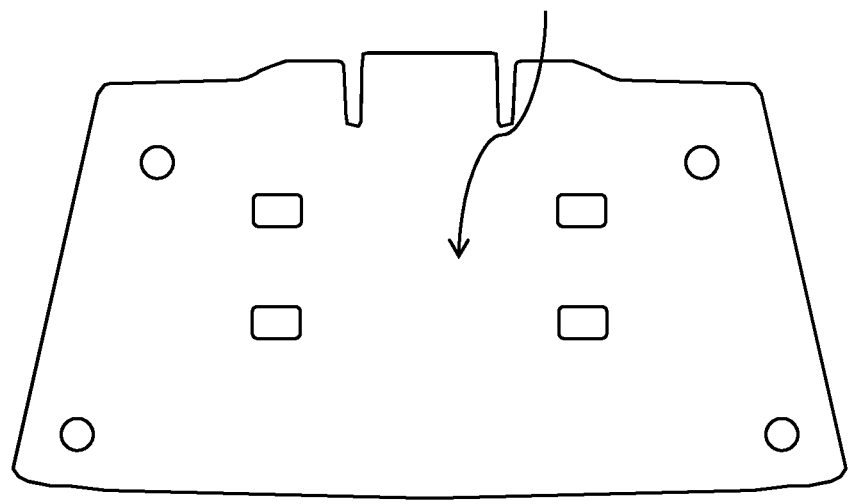
FIG. 6 shows an example of application of the composition as a motor vehicle underbody cover 100. The cover is a single molded piece comprised of a composition of a base polymer of PET with basalt and mica fillers.

The ratio of mica to basalt fibers in the filler can vary, depending on a particular desired property or requirements of the final product. FIG. 4 shows the how sound attenuation varies based on level of filler. Limiting the level of filler to 35% by weight of the final product demonstrates a preferred ratio of mica (with an 85 to 1 aspect ratio) to basalt of about 25 to 10. This ratio provides a product that aptly deflects heat coupled with significant noise attenuation. FIG. 5 shows heat deflection temperature of mica-basalt blend as 35% filler.

In some embodiments, the new blends of materials use recycled resins and fillers to produce advanced high tech materials that promise to significantly reduce cost and weight of many components. The high heat performance and improved sound attenuation of the new materials allow for the deletion of heat shields and added NVH pads that can add several dollars to and added weight to many underbody and under-hood parts.

In replacing bulky heat shields and NVH pads with a single underbody piece comprised of the composition described herein, both carbon emissions of automobiles and energy required to produce are significantly reduced by significant weight reduction in the automobile. Further benefits are seen in that recycled PET can be used as part or all of the base polymer, further reducing carbon emissions.

Accordingly, thus is provided a composition comprised of a base polymer and a filler. The filler may be comprised of mica and basalt fibers. The base polymer may comprise PET. PET may be recycled PET, such as from plastic soda bottles. The filler may comprise less than 40 percent by weight of the composition, such as between 30 and 35 percent. The base polymer may accordingly comprise between about 95 and 55 percent by weight of the composition. In instances where the filler comprises less than about 40 percent, the base polymer may comprise about 60 percent by weight of the composition or higher, such as between about 65 and 70 weight percent of the composition.

The composition may further include other agents such as coloring agents, stabilizers, coupling agents and flow enhancers. Coloring agents may be added to determine the final coloring of the composition. Each additional agent is added at a low amount with respect to the final composition, each being present at less than about 5 percent by weight of the final composition. As set forth in the examples herein, coloring agents may comprise about 1.5 weight percent, flow enhancers may comprise about 0.3 weight percent, stabilizers may comprise about 0.75 weight percent and coupling agents may comprise about 1.5 weight percent.

The filler may be comprised of mica and basalt fibers. Mica may be selected for a high aspect ratio to improve sound deadening capabilities of the composition. The mica may have an aspect ratio of between about 75 and 95 to one. In certain embodiments, the mica has an aspect ratio of about 85 to one. In some embodiments, more mica is desired than basalt fibers within the filler. Mica can be present at a ratio of about 5 to 30 with respect to basalt fiber.

Methods for producing the compositions are described herein.

Manufacturing an underbody piece comprises injection molding, compression injection molding or extrusion and thermoforming of the composition.

Automobiles comprised of the molded composition include the molded composition placed between a cabin and an underbody of a vehicle 100.

EXAMPLES

A sample formulation for PET composition is set forth in Table 1. This composition utilizes a PET recycled bottles blend with mica and basalt fiber filler. The composition was molded and the final product provided noise reduction of about 28-30% and heat deflection of temperatures around 200-220° C. The composition has a density of about 1.40 g/cm3, a flex modulus of about 10,800 Mpa, and a wall thickness of about 2 to 3 mm.

TABLE 1

| MATERIAL | PERCENTAGE |
| --- | --- |
| Polyester | 40% |
| Recycled Polyester Bottles | 21.22% |
| Low Density Color Concentrate | 1.50% |
| Stabilizer | 0.75% |
| Coupling Agent | 1.50% |
| Flow Enhancer | 0.03% |
| Mica | 25% |
| Basalt Fiber | 10% |
| Total | 100% |

A second formulation designed for maximum heat resistance and improved noise reduction is set forth in Table 2. This composition utilizes a PET recycled bottles blend with mica and basalt fiber filler. The composition was molded and the final product provided noise reduction of about 23-25% and heat deflection of temperatures around 220-250° C. The composition has a density of about 1.4 g/cm3, a flex modulus of about 12,000 Mpa, and a wall thickness of about 2 mm.

TABLE 2

| MATERIAL | PERCENTAGE |
| --- | --- |
| Polyester | 30.61% |
| Recycled Polyester Bottles | 30.61% |
| Low Density Color Concentrate | 1.50% |
| Stabilizer | 0.75% |
| Coupling Agent | 1.50% |
| Flow Enhancer | 0.03% |
| Mica | 20% |

TABLE 2-continued

| MATERIAL | PERCENTAGE |
| --- | --- |
| Basalt Fiber | 15% |
| Total | 100% |

The foregoing descriptions of various embodiments provide illustration of the inventive concepts. The descriptions are not intended to be exhaustive or to limit the disclosed composition to the precise form disclosed. Modifications or variations are also possible in light of the above teachings. The embodiments described above were chosen to provide the best application to thereby enable one of ordinary skill in the art to utilize the compositions in various embodiments and with various modifications as are suited to the particular use contemplated. All such modifications and variations are within the scope of the attached claims. All publications, patents and patent applications referenced herein are to be each individually considered to be incorporated by reference in their entirety.

The invention claimed is:

1. A composition for heat and sound shielding from the underbody of a vehicle comprising:
    a base polymer comprised of polyethylene terephthalate (PET);
    a filler comprised of mica and basalt fibers, wherein the base polymer comprises between about 60 and 70 percent by weight of the composition; and
    at least one of a coloring agent, a stabilizer, a flow enhancer, and a coupling agent.

2. The composition of claim 1, wherein the mica to basalt ratio within the filler is between about 25 to 10 and 20 to 15.

3. The composition of claim 1, wherein the base polymer comprises at least about 50 percent by weight of the composition.

4. The composition of claim 1, wherein the base polymer comprises a blend of recycled PET and virgin PET.

5. The composition of claim 4, wherein the blend is at a ratio of between about 1:1 and 2:1 of virgin PET to recycled PET.

6. The composition of claim 1, wherein the filler comprises between about 30 and 35 weight percent of the composition.

7. The composition of claim 1, wherein mica has an aspect ratio of about 85 to one.

8. A composition for heat and sound shielding from the underbody of a vehicle comprising:
    a base polymer comprised of polyethylene terephthalate (PET), wherein the base polymer comprises a blend of recycled PET and virgin PET;
    a filler comprised of mica and basalt fibers, wherein about 35 to 40 percent by weight of the composition is virgin PET, about 25 to 30 percent by weight of the composition is recycled PET, about 20 to 25 percent by weight of the composition is mica, and about 5 to 10 percent by weight of the composition is basalt fiber; and
    at least one of a coloring agent, a stabilizer, a flow enhancer, and a coupling agent.

9. A composition for heat and sound shielding from the underbody of a vehicle comprising:
    a base polymer comprised of polyethylene terephthalate (PET), wherein the base polymer comprises a blend of recycled PET and virgin PET;
    a filler comprised of mica and basalt fibers, wherein about 30 percent by weight of the composition is virgin PET, about 30 percent by weight of the composition is recycled PET, about 20 percent by weight of the composition is mica, and about 15 percent by weight of the composition is basalt fiber;

at least one of a coloring agent, a stabilizer, a flow enhancer, and a coupling agent.

10. A composition for heat and sound shielding from the underbody of a vehicle comprising:

a base polymer comprised of polyethylene terephthalate (PET);

a filler comprised of mica and basalt fibers, wherein the base polymer comprises at least 60 percent by weight of the composition; and at least one of a coloring agent, a stabilizer, a flow enhancer, and a coupling agent.

11. The composition of claim 10, wherein the mica to basalt ratio within the filler is between 25 to 10 and 20 to 15.

12. The composition of claim 10, wherein the base polymer comprises a blend of recycled PET and virgin PET.

13. The composition of claim 12, wherein a combined amount of the basalt fibers and the mica is between 30 and 35 weight percent of the composition.

* * * * *